(12) United States Patent
Lin et al.

(10) Patent No.: US 11,054,934 B2
(45) Date of Patent: Jul. 6, 2021

(54) ELECTRONIC DEVICE

(71) Applicant: ASUSTEK COMPUTER INC., Taipei (TW)

(72) Inventors: Sheng-Ta Lin, Taipei (TW); Chih-Wen Hsieh, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/425,602

(22) Filed: May 29, 2019

(65) Prior Publication Data

US 2019/0369797 A1 Dec. 5, 2019

(30) Foreign Application Priority Data

May 29, 2018 (CN) .......................... 201810531871.4

(51) Int. Cl.

| | |
|---|---|
| *G06F 3/038* | (2013.01) |
| *G06F 3/041* | (2006.01) |
| *G06F 3/02* | (2006.01) |
| *G06F 3/0482* | (2013.01) |
| *G06F 3/0485* | (2013.01) |

(Continued)

(52) U.S. Cl.
CPC .......... *G06F 3/0416* (2013.01); *G06F 3/0227* (2013.01); *G06F 3/038* (2013.01); *G06F 3/0482* (2013.01); *G06F 3/0485* (2013.01); *G06F 3/04886* (2013.01); *G06F 3/04897* (2013.01)

(58) Field of Classification Search
CPC ...... G06F 3/0416; G06F 3/038; G06F 3/0227; G06F 3/04897; G06F 3/04886; G06F 3/0485; G06F 3/0482; G06F 3/0488; G06F 3/04817; G06F 3/04847; G06F 3/0481
See application file for complete search history.

(56) References Cited

U.S. PATENT DOCUMENTS 10,114,485 B2    10/2018  Su
2008/0252604 A1*  10/2008  Huang ................ G06F 3/04897
                                                    345/172

(Continued)

FOREIGN PATENT DOCUMENTS

CN    104849674 A    8/2015
CN    205901822 U    1/2017

(Continued)

OTHER PUBLICATIONS

European Search Report based on corresponding Application No. 19177210.2-1221/3575946; dated Dec. 9, 2019.

(Continued)

*Primary Examiner* — Lunyi Lao
*Assistant Examiner* — Jarurat Suteerawongsa
(74) *Attorney, Agent, or Firm* — Muncy, Geissler, Olds & Lowe, P.C.

(57) ABSTRACT

An electronic device including a touch input unit, a display unit, and a control unit is provided. The touch input unit includes a first default input function. The display unit is configured to display a default interface or a first interface. The first interface is corresponding to the first default input function. The control unit is electrically connected to the touch input unit and the display unit for controlling the display unit to be switched from the default interface to the first interface.

6 Claims, 7 Drawing Sheets

(51) Int. Cl.
G06F 3/0488 (2013.01)
G06F 3/0489 (2013.01)

(56) References Cited

U.S. PATENT DOCUMENTS

| | | | | |
|---|---|---|---|---|
| 2009/0213081 A1* | 8/2009 | Case, Jr. | ............... | G06F 1/1616 |
| | | | | 345/173 |
| 2009/0228820 A1* | 9/2009 | Kim | ......................... | G06T 3/60 |
| | | | | 715/769 |
| 2009/0315867 A1* | 12/2009 | Sakamoto | ........... | G06F 3/03547 |
| | | | | 345/184 |
| 2014/0282151 A1* | 9/2014 | Harvey | ................. | G06F 3/0482 |
| | | | | 715/765 |
| 2016/0202778 A1* | 7/2016 | Su | ........................... | G06F 1/16 |
| | | | | 345/168 |

FOREIGN PATENT DOCUMENTS

| | | |
|---|---|---|
| CN | 106991099 A | 7/2017 |
| JP | 2006148536 A | 6/2006 |
| JP | 2018013979 A | 1/2018 |
| TW | 201528056 A | 7/2015 |

OTHER PUBLICATIONS

Reputed "New ThinkPad X1 Carbon" Japan, Jul. 16, 2014; retrieved Nov. 13, 2019; https://www.kototoka.com/entry/2014/07/16/lenovo-thinkpad-x1-carbon-review.

Office Action dated Nov. 20, 2019 in JP Application No. 2018-118912.

\* cited by examiner

ELECTRONIC DEVICE

CROSS-REFERENCE TO RELATED APPLICATION

This application claims the priority benefit of Application No. 201810531871.4, filed in CHINA on May 29, 2018. The entirety of the above-mentioned patent application is hereby incorporated by reference herein and made a part of the specification.

BACKGROUND OF THE INVENTION

Field of the Invention

The invention relates to an electronic device.

Description of the Related Art

Multiple use situations and multiplex operating modes of electronic devices have become an ordinary state, and it is more complicated for a user to operate different application software simultaneously or switch between different input modes. A conventional keyboard cannot provide multiplex input modes, as a result, a user may be confused, and further impacts the operation efficiency.

BRIEF SUMMARY OF THE DISCLOSURE

The disclosure provides an electronic device, including a touch input unit, a display unit and a control unit. The touch input unit includes a first default input function. The display unit is configured to display a default interface and a first interface. The first interface is corresponding to the first default input function. The control unit is electrically connected to the touch input unit and the display unit for controlling the display unit to be switched from the default interface to the first interface.

The electronic device of the disclosure effectively integrates touch input and conventional input devices (in an embodiment, the input device is a keyboard). The display unit displays an interface corresponding to the touch input function, so as to simplify an icon printed on the input device and provide a more explicit instruction to the user. In addition, the disclosure effectively reduces chaos caused by interface switch when the user uses multiple input devices, so as to provide more intuitive interface interaction to the user.

Specific embodiments adopted by the disclosure will be further illustrated by virtue of the following embodiments and drawings.

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
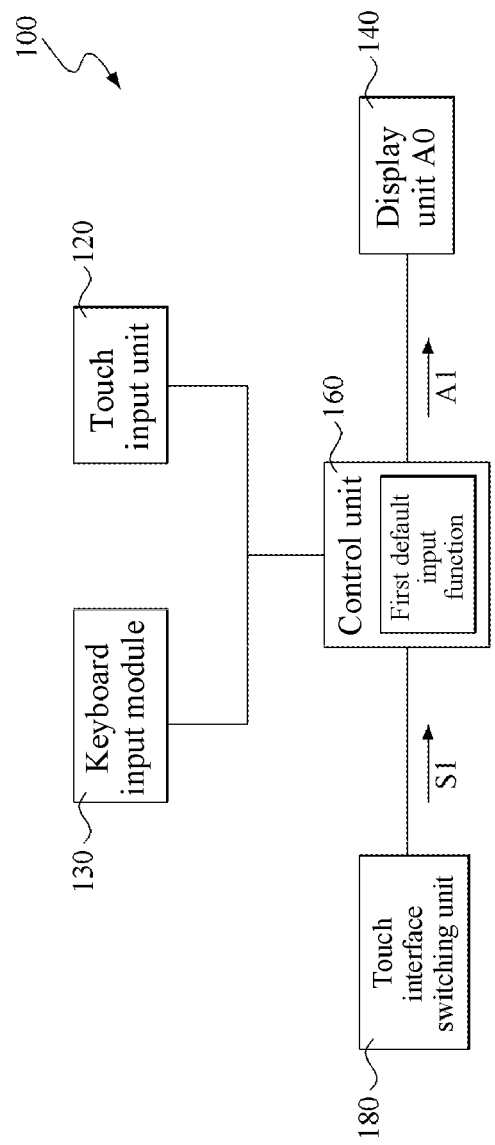
FIG. 1 is a block schematic diagram of an embodiment of an electronic device with a touch input function according to the disclosure.
Figure 2:
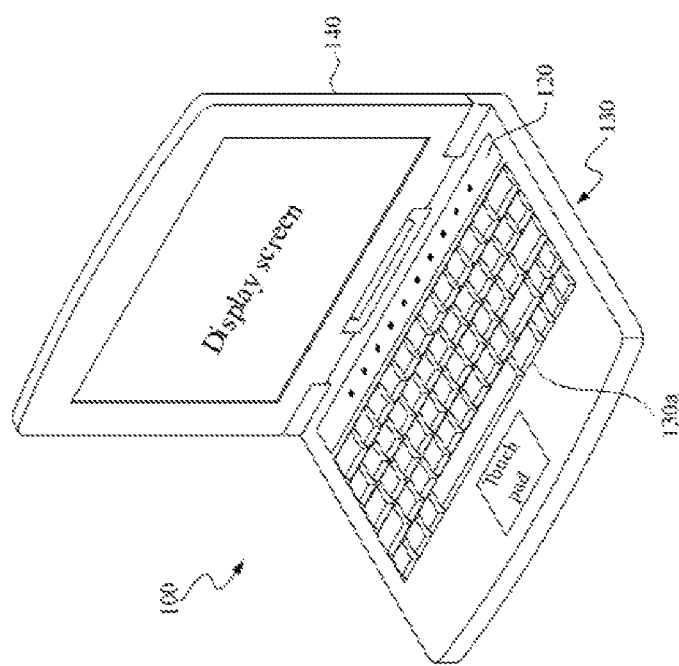
FIG. 2 is a structure schematic diagram of an embodiment of the electronic device with a touch input function according to the disclosure.

FIG. 1 is a block schematic diagram of an embodiment of an electronic device with a touch input function according to the disclosure. FIG. 2 is a structure schematic diagram of an embodiment of the electronic device with a touch input function according to the disclosure. A notebook computer is taken as an example for explaining the disclosure here.

As shown in the figures, the electronic device 100 comprises a touch input unit 120, a keyboard input module 130, a display unit 140, a control unit 160 and a touch interface switching unit 180.

The keyboard input module 130, in an embodiment, a standard keyboard, is configured to input data for a user. The touch input unit 120 is of a stripe shape or a long chain shape located above a key area 130a of the keyboard input module 130, and is adjacent to the lower edge of the display unit 140. It is to be understood that the contour and the configuration position of the touch input unit 120 are not limited thereto, and are not limited to be integrated in the keyboard input module 130. In an embodiment, the touch input unit 120 is an independent device, is separately connected to the keyboard input module 130, or is directly integrated to the outer frame of the display unit 140.

The touch input unit 120 is endowed with a first default input function by the control unit 160. A user executes the first default input function via the touch input unit 120 by using a touch manner. As for an embodiment, the touch input unit 120 replaces keys of the uppermost row of a general standard keyboard, namely, keys Esc, F1, F2, . . . , F12, Pause, and Del. That is, the first default input function is the function of the keys of the uppermost row in a conventional keyboard. The touch input unit 120 is also endowed with other input functions, including screen brightness, keyboard brightness, volume adjustment, setting and the like.

The touch input unit 120 includes a touch sensor, which is located below a touch plane, so as to sense the pressing action of the user. The touch sensor is a sensing element for sensing the pressing or contact action of the user. The touch sensor includes a capacitive sensor, a resistance type sensor, a force-sensing resistor (FSR) or an ultrasonic sensor. Such a touch sensing technology is well known in the technical field, and unnecessary details are not given here.

The display unit 140 is configured to display a user interface (UI), so that the user operates via the touch input unit 120 and the keyboard input module 130. In the embodiment, the display unit 140 selectively displays a default interface A0 and a first interface A1. When the electronic device 100 is turned on, the default interface A0 is displayed. The first interface A1 is an operation interface corresponding to the first default input function of the touch input unit 120. The default interface A0 is a default user interface of an operating system such as Windows, iOS, and Android. The specific embodiment of the first interface A1 is described in more details in subsequent sections corresponding to FIG. 3.

The control unit 160 is electrically connected to the touch input unit 120, the display unit 140 and the touch interface switching unit 180. The control unit 160 receives an input signal coming from the touch input unit 120 and generates a corresponding operation according to the above-mentioned first default input function.

The touch interface switching unit 180 is configured to generate a switching signal S1, and inform the control unit 160 of controlling the display unit 140 to be switched from the default interface A0 to the first interface A1 corresponding to the first default input function. The touch interface switching unit 180 is a specific key (in an embodiment, the specific key is key Fn) of the keyboard input module 130, a mouse or a touch element located in the display unit 140. Therefore, the display unit 140 is provided to display the first interface A1 by operation on the touch interface switching unit 180, so as to be favorable for the user to execute the first default input function via the touch input unit 120. This part is described in more details in subsequent sections corresponding to the first interface A1.

Although the touch input unit 120 is only endowed with the first default input function in the embodiment, the disclosure is not limited thereto. According to actual use requirement, the touch input unit 120 is additionally endowed with a second default input function by the control unit 160 to provide more diversified operations. In an embodiment, the above-mentioned first default input function is the function of the keys of the uppermost row in a conventional keyboard (mainly function keys F1, F2, . . . , F12). The second default input function is the function of screen brightness, keyboard brightness, volume adjustment, setting and the like.

Figure 3:
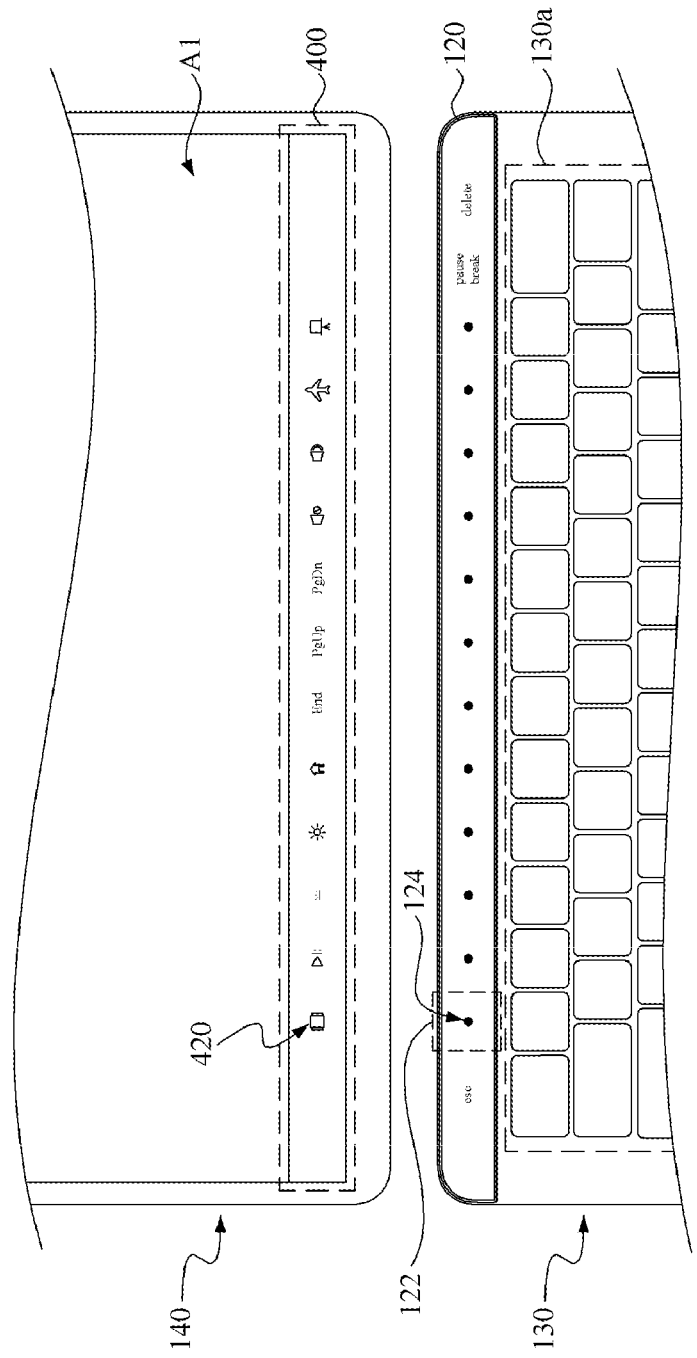
FIG. 3 is a schematic diagram of an embodiment of a touch input unit of the electronic device with a touch input function and a corresponding first interface according to the disclosure.

FIG. 3 is a schematic diagram of an embodiment of a touch input unit 120 of the electronic device with a touch input function and a corresponding first interface A1 according to the disclosure. As shown in the figure, the first interface A1 includes a toolbar 400, is located at the lower edge of the display unit 140, and is adjacent to the touch input unit 120. The toolbar 400 includes at least one icon 420, so as to prompt the user of the function of the touch input unit 120 located below the toolbar 400.

In the embodiment, the quantity of icons 420 of the toolbar 400 is corresponding to the quantity of touch buttons 122 of the touch input unit 120, the touch input unit 120 includes multiple cursors 124 to mark the position of each touch button, and the cursors are of various different designs, including solid dots, hollow dots and square dots.

In addition, the positions of icons 420 are respectively aligned to the positions of the touch buttons 122. According to actual use requirement, the quantity of icons 420 of the toolbar 400 is also less than the quantity of touch buttons 122 of the touch input unit 120, so as to prompt the user that some of the touch buttons 122 includes specific functions or some of the touch buttons 122 are executed.

Moreover, the disclosure prompts the user by changing a corresponding icon on the first interface A1, instead of adding an additional icon on the touch buttons 122, and therefore, mixing-up in operation of the user is avoided.

The touch input unit 120 of the embodiment includes the position of the touch button 122 marked by the cursor 124, and replaces icons used in a conventional keyboard. In an embodiment, according to actual use requirements, if the touch buttons 122 need to be endowed with multiple functions, one of the predetermined input functions of the touch buttons 122 is marked on the surface of the touch input unit 120, and the first interface A1 is configured to mark other predetermined input functions of the touch buttons 122.

Figure 4:
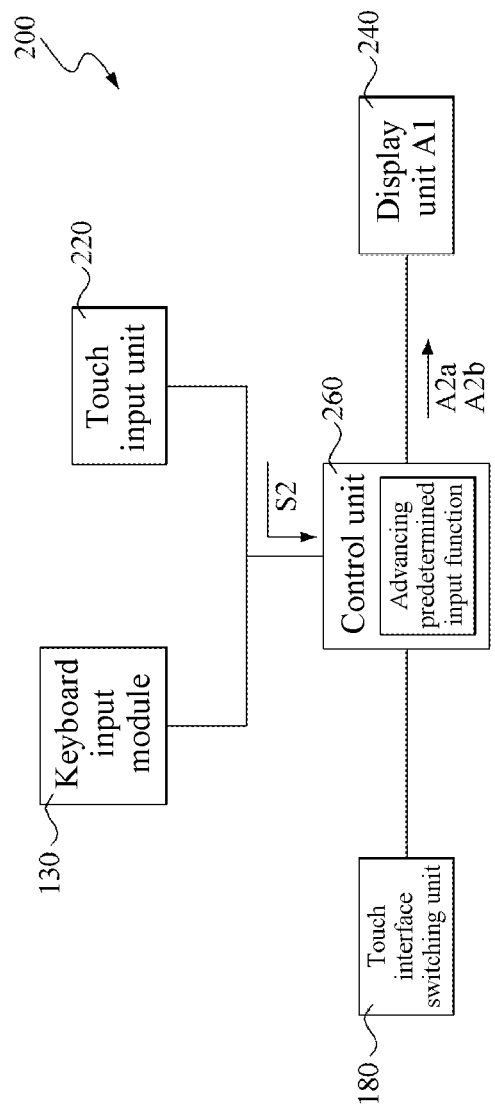
FIG. 4 is a block schematic diagram of another embodiment of the electronic device with a touch input function according to the disclosure.

FIG. 4 is a block schematic diagram of another embodiment of the electronic device 200 with a touch input function according to the disclosure. In an embodiment, under the operation mode of the first interface A1, in order to provide more intuitive operation to the user, if the touch input unit 220 is triggered to generate an advancing interface signal S2, the control unit 260 immediately endows the touch input unit 220 with an advancing predetermined input function, and controls the display unit 240 to display a corresponding second interface A2a or A2b, so as to be favorable for the user to execute the advancing predetermined input function via the touch input unit 220.

Figure 5:
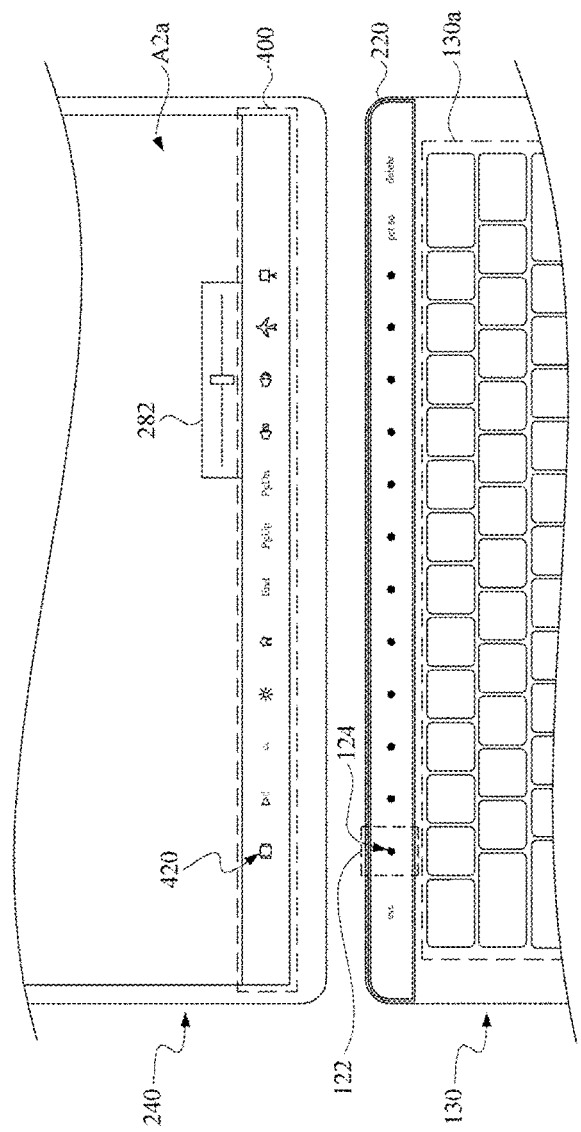
FIG. 5 is a schematic diagram of an embodiment of a touch input unit of the electronic device with a touch input function and a corresponding second interface according to the disclosure.
Figure 6:
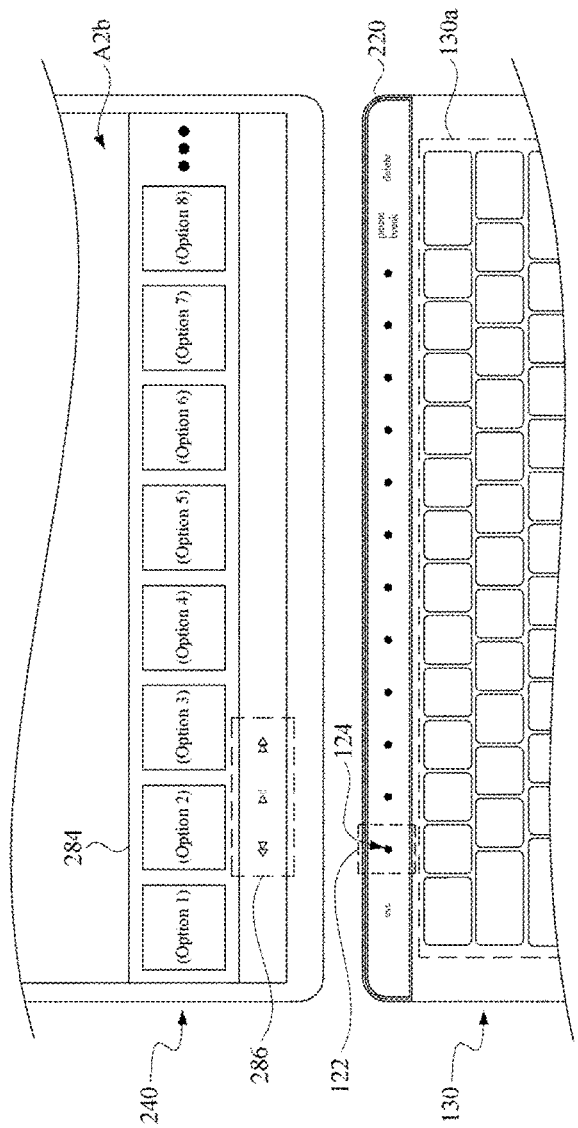
FIG. 6 is a schematic diagram of another embodiment of the touch input unit of the electronic device with a touch input function and a corresponding second interface.

FIG. 5 is a schematic diagram of an embodiment of a touch input unit 220 of the electronic device with a touch input function and a corresponding second interface A2a according to the disclosure. FIG. 6 is a schematic diagram of another embodiment of the touch input unit 220 of the electronic device with a touch input function and a corresponding second interface A2b.

Please refer to FIG. 4 and FIG. 5, under the operation mode of the first interface A1, when the user presses the touch button 122 corresponding to brightness or volume adjustment in the touch input unit 220, such as keys for keyboard brightness, screen brightness and volume adjustment (that is, corresponding to the advancing interface signal S2), the control unit 260 immediately controls the display unit 240 to display the corresponding second interface A2a, so as to bring out a slider operation interface 282, and meanwhile, the touch input unit 220 is also switched to the corresponding advancing predetermined input function, so that the user performs a digit adjustment by an analogical pattern (that is, the user adjusts brightness or volume by dragging the slider).

Please refer to FIG. 4 and FIG. 6, under the operation mode of the first interface A1, when the user presses keys corresponding to audio and video playing in the touch input unit 220 (that is, corresponding to the advancing interface signal S2), the control unit 260 controls the display unit 240 to display the corresponding second interface A2b, so as to bring out a menu 284 and a function operation row 286, and meanwhile, the touch input unit 220 is also switched to the corresponding advancing predetermined input function for the user to select and operate. As for an embodiment, the advancing predetermined input function distinguishes different pressing actions of the user, including single-touch short time and single-touch long time, so as to execute different operation functions.

According to the above-mentioned embodiment, under the operation of the first interface A1, the touch input unit 220 is endowed with two different advancing predetermined input functions, and corresponding second interfaces A2a and A2b are displayed. According to actual requirements, under the operation of the first interface A1, the touch input unit 220 is endowed with input functions of more types or more levels, and the display unit 240 is controlled to display a corresponding interface to be favorable for the user to operate.

Figure 7:
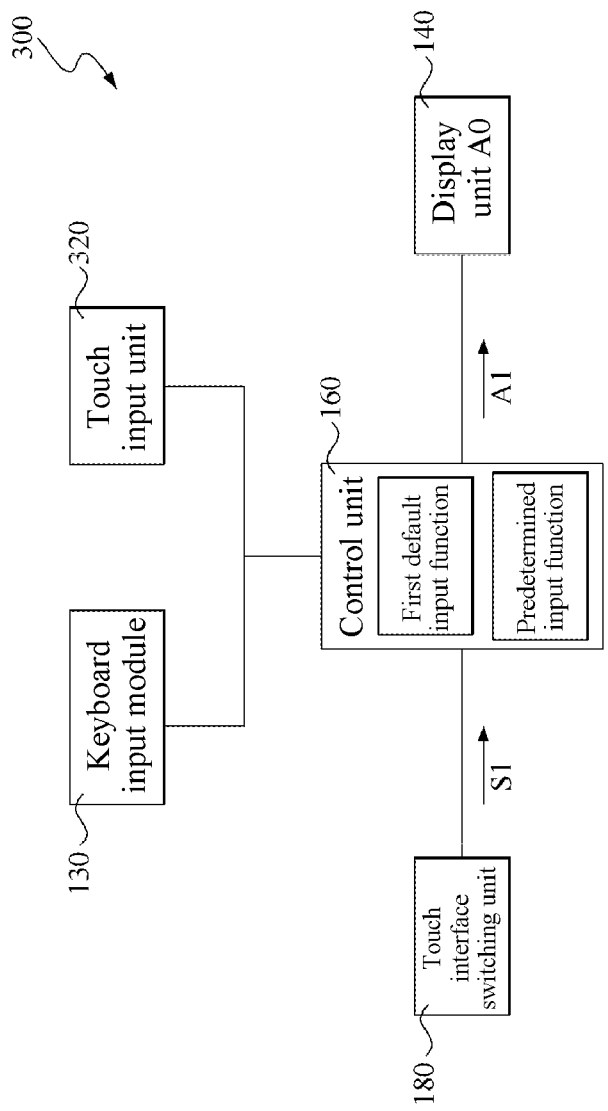
FIG. 7 is a block schematic diagram of another embodiment of the electronic device with a touch input function according to the disclosure.

FIG. 7 is a block schematic diagram of another embodiment of the electronic device 300 with a touch input function according to the disclosure. The main difference between the embodiment and the embodiment of FIG. 1 is that the touch input unit 320 of the embodiment is selectively endowed with the predetermined input function and the first default input function by the control unit 160. The predetermined input function is different from the first default input function. In an embodiment, if the predetermined input function is corresponding to the functions of the keys of the uppermost row in a conventional keyboard, namely, keys Esc, F1, F2, . . . , F12, Pause, and Del, the first default input function is corresponding to the functions of display brightness, keyboard brightness, volume adjustment, setting and the like.

The predetermined input function is the default input function of the electronic device 300, namely, the input function executed by the touch input unit 320 when the user does not control the display unit 140 to switch from the default interface A0 to the first interface A1 by the touch interface switching unit 180.

The user triggers the control unit 160 to switch to the first default input function by the operation of the touch interface switching unit 180, and in an embodiment, the operation is pressing a specific key of the keyboard input module 130, so as to control the operation of the touch input unit 320, and control the display unit 140 to display a corresponding first interface A1, and further be favorable for the user to operate. Other parts of the embodiment are similar to those in the embodiment in FIG. 1, and unnecessary details are not given here.

The above-mentioned embodiment also includes the predetermined input function besides the first default input function, and directly applies the default interface of the electronic device. As for an embodiment, an icon is marked on the touch input unit 320 of the electronic device, so as to prompt the user of the predetermined input function corresponding to the touch input unit 320.

The electronic device of the disclosure effectively integrates touch input and a conventional input device (in an embodiment, the input device is a keyboard). The display unit displays an interface corresponding to the touch input function, so as to simplify icons needing to be printed on the input device, provide the user with more explicit instructions and provide the user with more intuitive interface interaction.

The foregoing descriptions are merely preferred embodiments of the disclosure and are not intended to limit the disclosure in any way. Any person skilled in the art can make any form of equivalent replacement or modification to the technical means and technical contents disclosed by the disclosure without departing from the scope of the technical means of the disclosure, and such equivalent replacement or modification does not depart from the contents of the technical means of the present disclosure and still falls within the protection scope of the disclosure.

What is claimed is:

1. An electronic device, comprising:
    a touch input unit, comprising a first default input function, a plurality of advancing predetermined input functions and a plurality of touch buttons;
    a display unit, configured to display a default interface, a first interface or one of a plurality of second interfaces, the first interface including a toolbar having a plurality of icons, each of the plurality of second interfaces including a menu and a function operation row in different bars, wherein the first interface is corresponding to the first default input function, and the plurality of second interfaces are individually corresponding to the plurality of advancing predetermined input functions;
    a control unit, electrically connected to the touch input unit and the display unit for controlling the touch input unit and the display unit; and
    a touch interface switching unit, configured to generate a switching signal for informing the control unit of controlling the display unit to be switched from the default interface to the first interface;
    wherein, by activating the touch interface switching unit to generate the switching signal while the display unit is displaying the default interface, the control unit controls the display unit to display the first interface and the touch input unit to execute the first default input function;
    wherein the plurality of icons is respectively aligned in position to the plurality of touch buttons;
    wherein, when one of the plurality of touch buttons is pressed at the display unit while the display unit is displaying the first interface, the control unit controls the display unit to display corresponding one of the plurality of second interfaces and the touch input unit is to execute one of the plurality of advancing predetermined input functions corresponding to the one of the plurality of touch buttons.

2. The electronic device according to claim 1, further comprising a keyboard input module, wherein the touch input unit is located at an upper edge of a key area of the keyboard input module.

3. The electronic device according to claim 1, wherein the touch interface switching unit is a mouse.

4. The electronic device according to claim 1, wherein the touch interface switching unit is a function key of the keyboard input module.

5. The electronic device according to claim 1, wherein the touch interface switching unit is a touch element, and the touch element is located on the display unit.

6. The electronic device according to claim 1, wherein the function operation row is a slider operating interface.

* * * * *